(12) United States Patent
Ko et al.

(10) Patent No.: US 12,537,413 B2
(45) Date of Patent: Jan. 27, 2026

(54) MOTOR AND WASHING MACHINE HAVING SAME

(71) Applicant: SAMSUNG ELECTRONICS CO., LTD., Suwon-si (KR)

(72) Inventors: Eunsuk Ko, Suwon-si (KR); Unyong Lee, Suwon-si (KR); Jinwoo Cho, Suwon-si (KR); Jungin Min, Suwon-si (KR); Jongjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 247 days.

(21) Appl. No.: 18/229,520

(22) Filed: Aug. 2, 2023

(65) Prior Publication Data
US 2023/0378839 A1 Nov. 23, 2023

Related U.S. Application Data

(63) Continuation of application No. PCT/KR2022/004282, filed on Mar. 28, 2022.

(30) Foreign Application Priority Data

Apr. 22, 2021 (KR) .......................... 10-2021-0052088

(51) Int. Cl.
*H02K 3/52* (2006.01)
*D06F 23/02* (2006.01)
(Continued)

(52) U.S. Cl.
CPC ............. *H02K 3/522* (2013.01); *D06F 23/02* (2013.01); *D06F 37/206* (2013.01); *D06F 37/22* (2013.01);
(Continued)

(58) Field of Classification Search
CPC .... H02K 3/522; H02K 2203/12; D06F 23/02; D06F 37/33; D06F 37/206; D06F 37/304
See application file for complete search history.

(56) References Cited

U.S. PATENT DOCUMENTS 8,857,222 B2 10/2014 Hong
8,984,917 B2* 3/2015 Kim ...................... D06F 37/304
68/3 R
(Continued)

FOREIGN PATENT DOCUMENTS

KR 10-205-0051870 6/2005
KR 10-2005-0064926 6/2005
(Continued)

OTHER PUBLICATIONS

PCT/ISA/210 dated Jul. 22, 2022 in International Patent Application No. PCT/KR2022/004282.

*Primary Examiner* — Alexander A Singh
*Assistant Examiner* — Charlie Frank Mann
(74) *Attorney, Agent, or Firm* — STAAS & HALSEY LLP

(57) ABSTRACT

A washing machine including a tub, a stator fastenable to a rear of the tub, and a rotor to electromagnetically interact with the stator and rotate around a rotating shaft, where the stator includes a stator core, an insulator configured to surround the stator core, and a bracket fastenable to the insulator, and fastenable to the rear of the tub such that while the stator is to the tub the stator is fastened to the rear of the tub through the bracket while the bracket is fastened to the insulator and the rear of the tub.

14 Claims, 13 Drawing Sheets

(51) Int. Cl.
  *D06F 37/20*   (2006.01)
  *D06F 37/22*   (2006.01)
  *D06F 37/30*   (2020.01)

(52) U.S. Cl.
  CPC ....... *D06F 37/304* (2013.01); *H02K 2203/12* (2013.01)

(56) References Cited

U.S. PATENT DOCUMENTS

| | | | |
|---|---|---|---|
| 9,906,084 B2* | 2/2018 | Duncan | H02K 1/187 |
| 10,003,224 B2* | 6/2018 | Jang | H02K 1/187 |
| 10,381,891 B2* | 8/2019 | Jang | H02K 3/325 |
| 11,242,635 B2 | 2/2022 | Lee et al. | |
| 2008/0148785 A1 | 6/2008 | Lee et al. | |
| 2009/0113941 A1* | 5/2009 | Kim | D06F 37/206 29/700 |
| 2016/0329757 A1 | 11/2016 | Li et al. | |

FOREIGN PATENT DOCUMENTS

| | | |
|---|---|---|
| KR | 10-2006-0044096 | 5/2006 |
| KR | 10-2007-0004508 | 1/2007 |
| KR | 10-1235743 | 2/2013 |
| KR | 10-1297996 | 8/2013 |
| KR | 10-1486344 | 1/2015 |
| KR | 10-1663387 | 10/2016 |
| KR | 10-2019-0023150 | 3/2019 |
| KR | 10-1987204 | 6/2019 |

* cited by examiner

MOTOR AND WASHING MACHINE HAVING SAME

CROSS-REFERENCE TO RELATED APPLICATION

This application is a continuation application, under 35 U.S.C. § 111(a), of international application No. PCT/KR2022/004282, filed on Mar. 28, 2022, which claims priority under 35 U. S. C. § 119 to Korean Patent Application No. 10-2021-0052088, filed Apr. 22, 2021, the disclosures of which are incorporated herein by reference in their entireties.

BACKGROUND

Field

The disclosure relates to a motor having an improved fastening structure with a tub and a washing machine having the same.

Description of Related Art

In general, washing machines are apparatuses that use the driving force of a motor to agitate laundry, wash water, and detergent placed in a tub together, so that washing is performed by mutual friction.

A washing machine includes a cabinet, a tub installed in the cabinet to receive wash water, a drum rotatably installed in the tub to receive laundry, a motor for rotating the drum, and a water supply device for supplying wash water to the tub, and a discharge device for discharging wash water from the drum to the outside of the cabinet when washing is completed.

A motor is a device that derives rotational force from electrical energy and includes a stator and a rotor. The rotor interacts electromagnetically with the stator and is rotated by a force acting between a magnetic field and a current flowing in coils.

The driving force of the motor is transmitted to the drum by a rotating shaft, and a bearing housing rotatably supporting the rotating shaft is provided on a rear surface of the tub.

The stator includes a stator core and an insulator provided to surround the stator core. The insulator is fastened to the bearing housing, so that the stator is fastened to the tub.

The insulator of the stator, which is directly coupled to the bearing housing, allows the vibration generated in the stator core to be directly transmitted to the tub through the insulator, so that noise due to the vibration may be generated during washing machine operation.

SUMMARY

In accordance with one aspect of the disclosure, a washing machine includes a tub, a stator fastenable to a rear of the tub, and a rotor to electromagnetically interact with the stator and rotate around a rotating shaft, where the stator includes a stator core, an insulator configured to surround the stator core, and a bracket fastenable to the insulator, and fastenable to the rear of the tub such that while the stator is fastened to the rear of the tub the stator is fastened to the rear of the tub through the bracket while the bracket is fastened to the insulator and the rear of the tub.

The bracket may include a plurality of insulator fastening holes fastenable to the insulator by a first fastener, and a plurality of tub fastening holes fastenable to the tub by a second fastener.

The first fastener and the second fastener may be fastenable in opposite directions with respect to the bracket.

The insulator may include a bracket receiving groove recessed so that the bracket is received and fastened to the insulator.

The insulator may include a plurality of bracket fastening portions to which the bracket is fastenable, and a plurality of first bracket fastening holes at positions corresponding to the plurality of insulator fastening holes of each of the plurality of bracket fastening portions and to which the bracket is fastenable by the first fastener.

Portions of the insulator, except for the plurality of bracket fastening portions, may be spaced apart from the bracket to prevent contact with the bracket.

The tub may include a bearing housing to which the stator is fastenable, and the bearing housing may include a plurality of second bracket fastening holes at positions corresponding to the plurality of tub fastening holes and to which the bracket is fastenable by the second fastener.

The bearing housing may include a plurality of guide pins configured to allow the bracket to be guided to a position to which the bracket is fastenable.

The insulator may include a plurality of guide holes to which the plurality of guide pins are coupleable to allow guide a fastening position between the bearing housing and the bracket.

The bracket may include a plurality of guide holes to which the plurality of guide pins are coupleable to allow the bracket to be guided to a fastening position between the bearing housing and the bracket.

The bracket may include a recessed portion formed by recessing around the plurality of tub fastening holes such that the second fastener fastened to the plurality of tub fastening holes avoids interference with the rotor.

The bracket may include a reinforcing rib formed around the plurality of tub fastening holes to reinforce strength of the bracket.

The bracket may include a connecting rib formed between the plurality of tub fastening holes to align the plurality of tub fastening holes.

The connecting rib may include a plurality of through holes to penetrate the bracket.

The bracket may be formed of a metal material, with an elastic member formed of rubber between the plurality of first bracket fastening holes and the plurality of insulator fastening holes.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
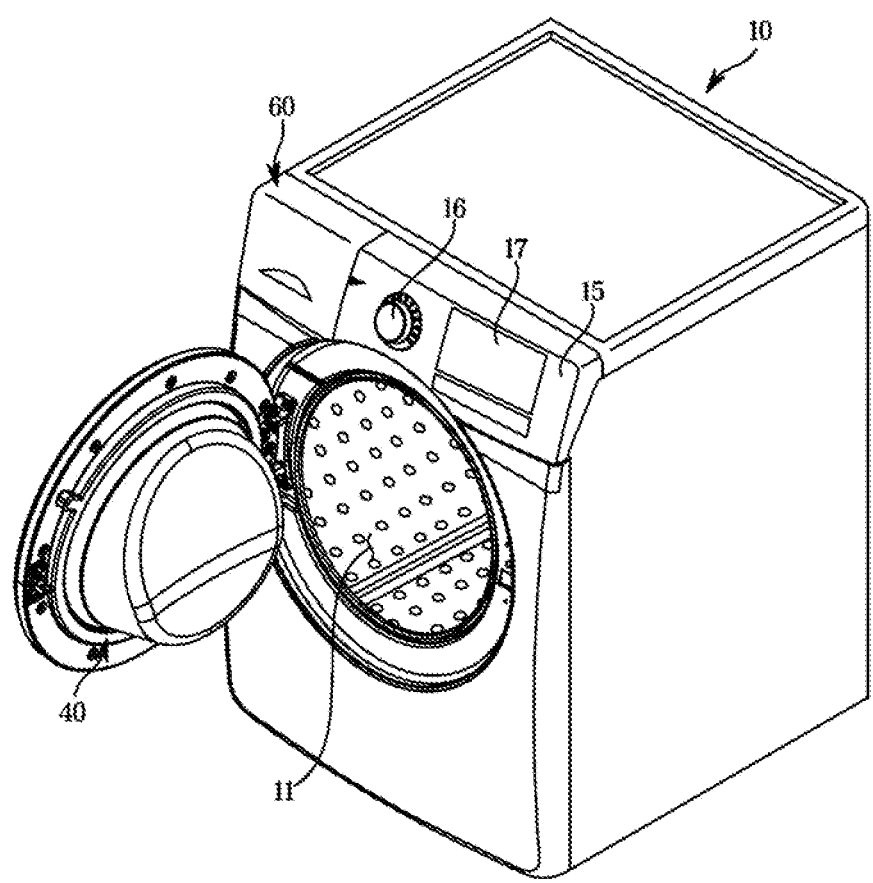
FIG. 1 is a perspective view illustrating a washing machine according to an embodiment of the disclosure.

Embodiments described in the disclosure and configurations shown in the drawings are merely examples of the embodiments of the disclosure and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "upper side", "lower side" and "front-rear direction" may be defined by the drawings, but the shape and the location of the component is not limited by the term.

Therefore, it is an aspect of the disclosure to provide a motor having an improved fastening structure with a tub so that vibration generated in a stator core by motor operation is not directly transmitted to the tub through an insulator, and a washing machine having the same.

According to various embodiments of the disclosure, vibration generated in the stator core is transmitted through the insulator to the bracket and then transmitted to the tub, so that noise caused by the vibration during washing machine operation can be reduced.

Hereinafter, various embodiments according to the disclosure will be described in detail with reference to the accompanying drawings.

Figure 2:
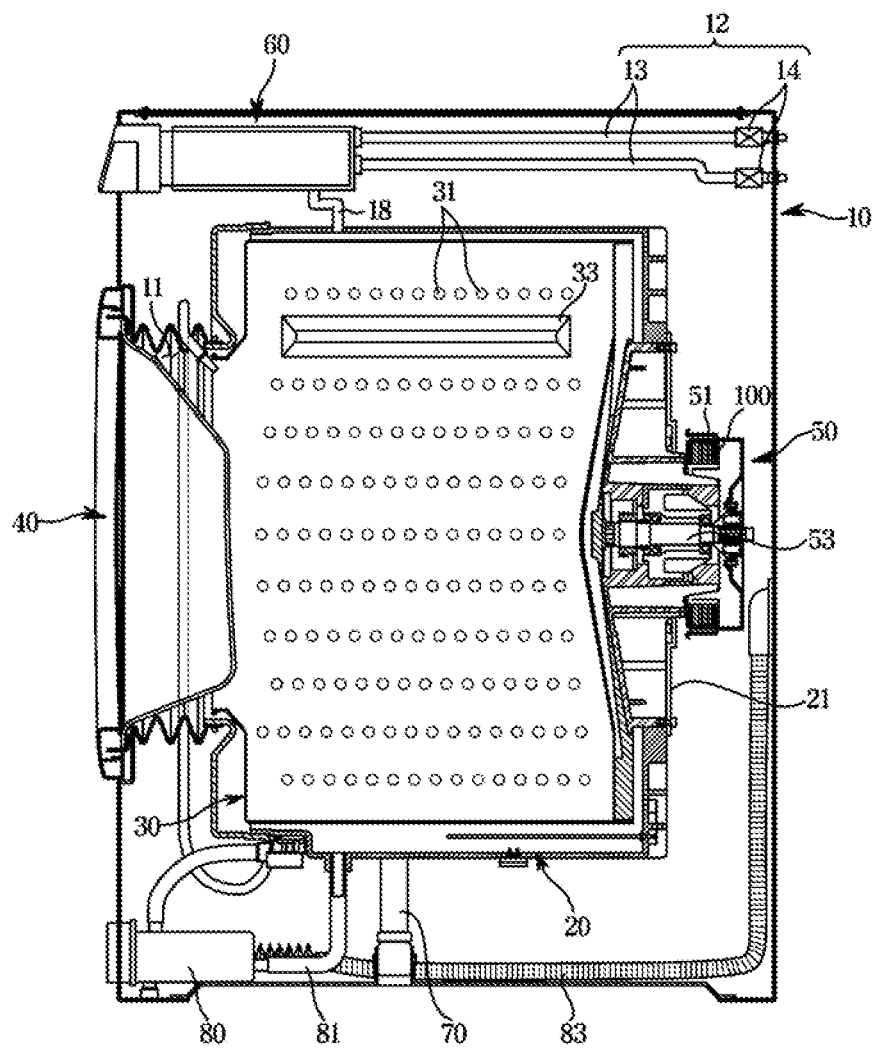
FIG. 2 is a side cross-sectional view illustrating a washing machine according to an embodiment of the disclosure.

FIG. 1 is a perspective view illustrating a washing machine according to an embodiment of the disclosure. FIG. 2 is a side cross-sectional view illustrating a washing machine according to an embodiment of the disclosure.

As shown in FIG. 1 and FIG. 2, a washing machine may include a cabinet 10 that forms an exterior and accommodates various components therein. The washing machine may include a tub 20 provided in the cabinet 10 to receive mixed water in which water and detergent are mixed. The washing machine may also include a drum 30 rotatably provided in the tub 20 to receive laundry. The washing machine may also include a motor 50 for rotating the drum 30.

The cabinet 10 may have a substantially hexahedral shape. The cabinet 10 may have a box shape with an open front.

A control panel 15 including an input device 16 for receiving operating instructions from a user and a display device 17 for displaying operating information of the washing machine may be provided on a front surface of the cabinet 10.

An inlet 11 may be formed on a front side of the cabinet 10 to allow laundry to be inserted into the drum 30. The inlet 11 may be opened and closed by a door 40. The door may be rotatably mounted on a front surface of the cabinet 10 by a hinge member (not shown).

A water supplier 12 including a water supply pipe 13 and a water supply valve 14 for controlling water supply may be provided above the tub 20. In addition, a detergent dispenser 60 for supplying detergent to the inside of the tub 20 during a water supply process may be installed at an upper portion of the front side of the tub 20.

The detergent dispenser 60 may be connected to the tub 20 through a supply pipe 18. Water from the water supply pipe 13 is mixed with detergent via the detergent dispenser 60, and mixed water of water and detergent may be supplied into the tub 20. If the detergent is liquid detergent, the water supply pipe 13 may directly supply water into the tub 20 through a separate control valve (not shown), and the liquid detergent may be supplied to the inside of the tub 20 through the detergent supply pipe (not shown) from the detergent dispenser 60.

A motor 50 may be provided on a rear side of the drum 30. The motor 50 is configured to rotate the drum 30 and may be provided to rotate the drum 30 by transmitting the driving force generated by the motor 50 to a rotating shaft 53.

The motor 60 may include a stator 100 fixed to a bearing housing 21 at the rear side of the tub 20 and a rotor 51 rotating by electromagnetically interacting with the stator 100, thereby converting electrical power into mechanical rotary power.

The tub 20 receives mixed water in which water and detergent are mixed and may be formed in a substantially cylindrical shape. The tub 20 may be fixed to the inside of the cabinet 10. The bearing housing 21, which is provided to rotatably support the rotating shaft 53, may be installed on the rear side of the tub 20. The bearing housing 21 may be made of an aluminum alloy. The bearing housing 21 may be inserted into the rear side of the tub 20 when the tub 20 is injection molded. The stator 100 of the motor 50 is fastened to the bearing housing 21, and a fastening structure in which the stator 100 is fastened to the bearing housing 21 will be described below.

In a lower portion of the tub 20, a drain pump 80 for discharging water inside the tub to the outside of the main body 10, a connection hose 81 for connecting the tub 20 and the drain pump 80 so that water inside the tub 20 flows into the drain pump 80, and a drain hose 83 for guiding water pumped by the drain pump 80 to the outside of the main body 10 may be provided.

The tub 20 may be elastically supported from the cabinet 10 by upper springs (not shown) and lower dampers 70. In other words, when the vibration generated by the rotation of the drum 30 rotates is transmitted to the tub 20 and the cabinet 10, the springs and dampers 70 may absorb vibration energy between the tub 20 and the cabinet 10 to damp the vibration.

The drum 30 rotates inside the tub 20 to lift and drop laundry to perform washing. A plurality of through holes 31 for circulation of wash water may be formed around the drum 30. Furthermore, a plurality of lifters 33 may be installed inside the drum 30 to allow laundry to be lifted and dropped as the drum 30 rotates.

Figure 3:
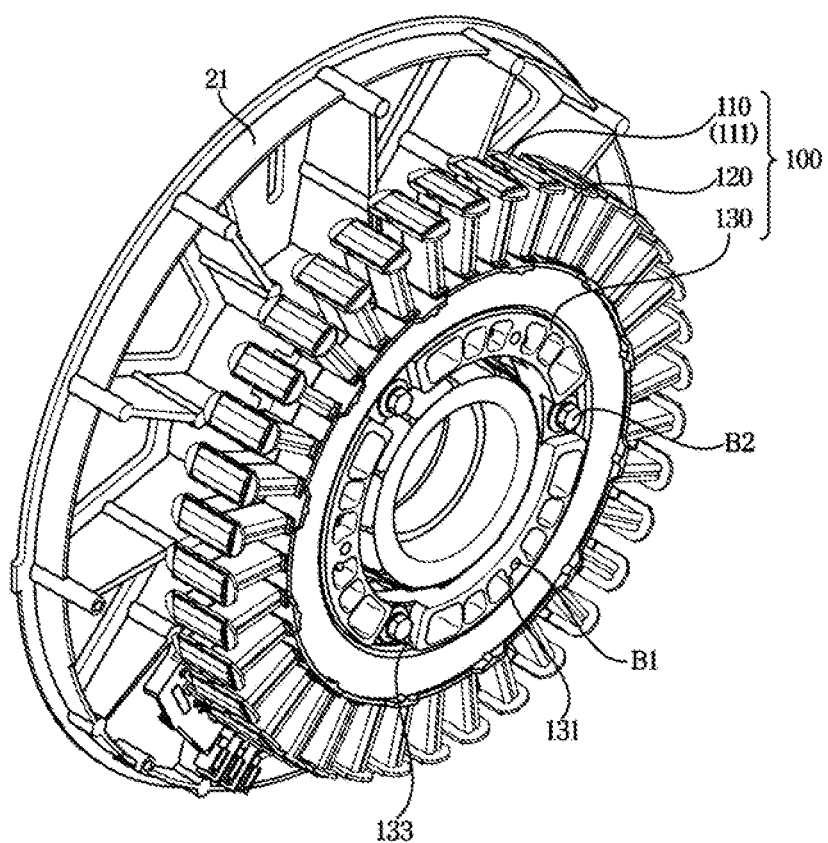
FIG. 3 is a view illustrating a state in which a stator is fastened to a bearing housing according to an embodiment of the disclosure.
Figure 4:
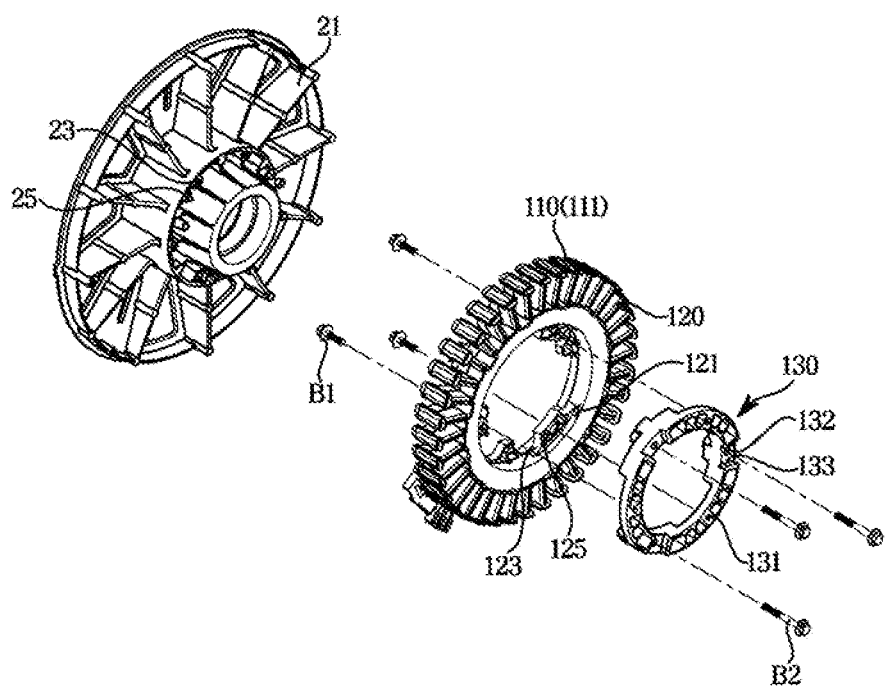
FIG. 4 is a view illustrating a state in which a stator and a bearing housing are fastened together according to an embodiment of the disclosure.

FIG. 3 is a view illustrating a state in which a stator is fastened to a bearing housing according to an embodiment of the disclosure. FIG. 4 is a view illustrating a state in which a stator and a bearing housing are fastened together according to an embodiment of the disclosure.

As shown in FIG. 3 to FIG. 4, the stator 100 may include a stator core 110. The stator 100 may also include an insulator 120 provided to surround the stator core 110. The stator 100 may include a coil (not shown) wound around the insulator 120.

The stator core 110 may include a plurality of teeth 111. The coils may be wound around the insulator 120 at a position corresponding to the plurality of teeth 111.

The insulator 120 may be provided to surround the stator core 110. The insulator 120 may be made of a material having electrical insulation.

The stator 100 may include a bracket 130 fastened to a rear side of the insulator 120. The bracket 130 may be formed of a metal material. For example, the bracket 130 may be made of aluminum. The bracket 130 fastened to the rear side of the insulator 120 may be fastened to the bearing housing 21. The stator 100 may be fastened to the bearing housing 21 by the bracket 130. In other words, vibration generated in the stator core 110 during operation of the motor 50 may be transmitted to the tub 20 via the bracket 130, rather than being transmitted directly to the tub 20 via the insulator 120. Accordingly, the vibration generated in the stator core 110 is attenuated in a process of being transmitted to the tub 20 via the bracket 130, and consequently the vibration transmitted to the tub 20 may be reduced. In addition, as the vibration transmitted to the tub 20 is reduced, the noise generated by the vibration during operation of the washing machine may also be improved (see FIG. 2).

The bracket 130 may be fastened to the insulator 120 by a plurality of first fasteners B1. In addition, the stator 100 to which the bracket 130 is fastened may be fastened to the bearing housing 21 by a plurality of second fasteners B2. The plurality of first fasteners B1 may be fastened in a direction from a front to a rear of the bracket 130. The plurality of second fasteners B2 may be fastened in a direction opposite to a fastening direction of the plurality of first fasteners B1. In other words, the plurality of second fasteners B2 may be fastened in a direction from the rear to the front of the bracket 130.

Figure 5:
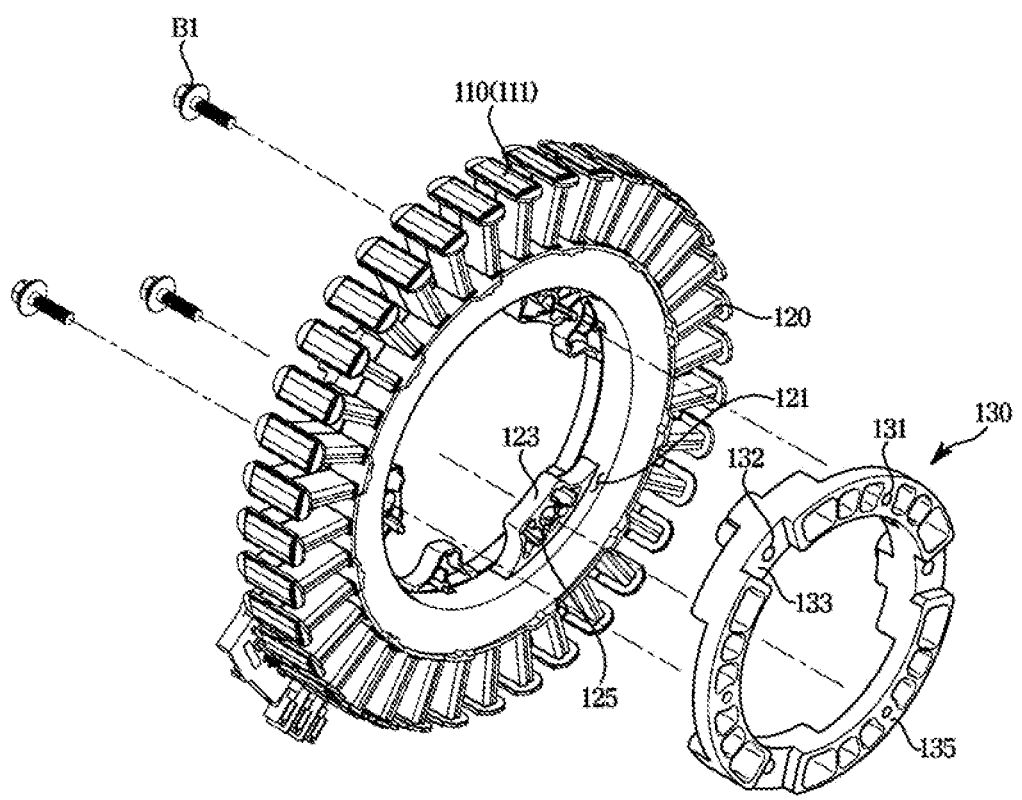
FIG. 5 is a view illustrating a state in which a bracket is fastened to an insulator according to an embodiment of the disclosure.
Figure 6:
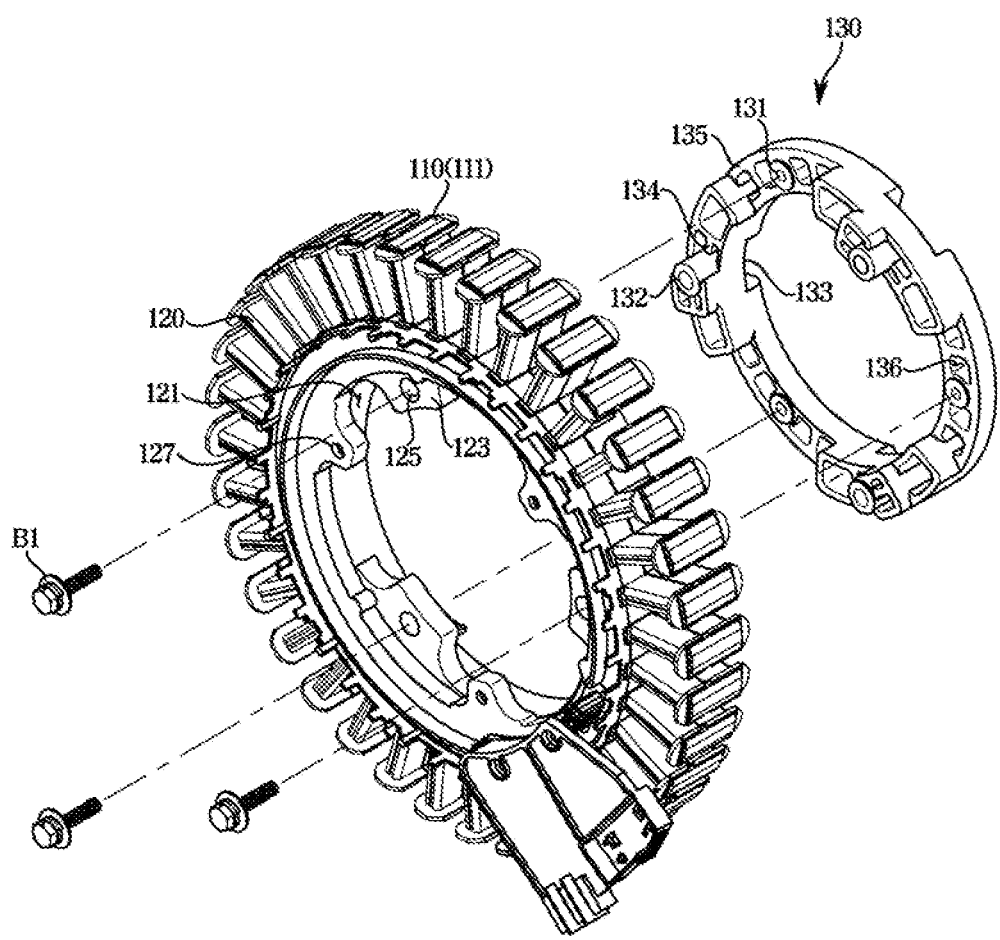
FIG. 6 is a view of FIG. 5 from a different direction according to an embodiment of the disclosure.
Figure 7:
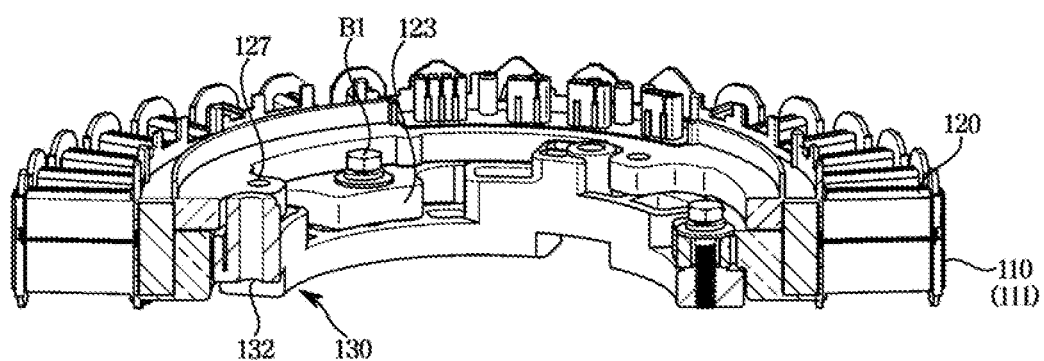
FIG. 7 is a view illustrating a state in which only a fastened portion of a bracket and the insulator are in contact and the remaining portions are spaced apart according to an embodiment of the disclosure.

FIG. 5 is a view illustrating a state in which a bracket is fastened to an insulator according to an embodiment of the disclosure. FIG. 6 is a view of FIG. 5 from another direction. FIG. 7 is a view illustrating a state in which only a fastened portion of the bracket and the insulator are in contact and the remaining portions are spaced apart according to an embodiment of the disclosure.

As shown in FIG. 5 to FIG. 7, the insulator 120 may include bracket receiving groove 121 into which the bracket 130 is received and fastened. The bracket receiving groove 121 may be provided at the rear side of the insulator 120. The bracket receiving groove 121 may be recessed forward so that the bracket 130 may be accommodated therein. In other words, the bracket 130 is received in the bracket receiving groove 121 at the rear side of the insulator 120, and although the bracket 130 is fastened to the insulator 120, the thickness of the insulator 120 may be maintained as if the bracket 130 is not present. Accordingly, although the bracket 130 is fastened to the insulator 120, the bracket 130 may avoid interference with the rotor 51 (see FIG. 2) disposed behind the stator 100. As a result, the thickness of the stator 100 may be maintained while reducing the vibration generated in the stator core 110 and transmitted to the tub 20, so that the motor 50 (see FIG. 2) may be provided in a more compact form.

The insulator 120 may include a plurality of bracket fastening portions 123 to which the bracket 130 is fastened. The insulator 120 may include a plurality of first bracket fastening holes 125 provided to fasten the bracket 130 to each of the plurality of bracket fastening portions 123.

The plurality of first bracket fastening holes 125 may be provided at positions corresponding to a plurality of insulator fastening holes 131 provided in the bracket 130. The plurality of first fasteners B1 fastening the bracket 130 to the insulator 120 may be provided in a number corresponding to the plurality of insulator fastening holes 131 and the plurality of first bracket fastening holes 125. In the drawings, the plurality of insulator fastening holes 131 and the plurality of first bracket fastening holes 125 are provided three by one, but are not limited thereto. The plurality of insulator fastening holes 131 and the plurality of first bracket fastening holes 125 may be provided in three or more in consideration of fastening strength and stability between the bracket 130 and the insulator 120.

The bracket 130 may be fastened to the insulator 120 by the plurality of first fasteners B1. The bracket 130 may include the plurality of insulator fastening holes 131 fastened to the insulator 120 by the plurality of first fasteners B1.

The remaining portions of the insulator 120, except for the plurality of bracket fastening portions 123 to which the bracket 130 is fastened, may be spaced apart from the bracket 130 to prevent contact with the bracket 130. In other words, the bracket 130 is only allowed to contact the plurality of bracket fastening portions 123 of the insulator 120 with a contact portion, and the remaining portions of the bracket 130, except for the contact portion, are not allowed to contact the insulator 120. Accordingly, the vibration transmitted from the insulator 120 to the bracket 130 may be minimized by minimizing the contact between the bracket 130 and the insulator 120.

Figure 8:
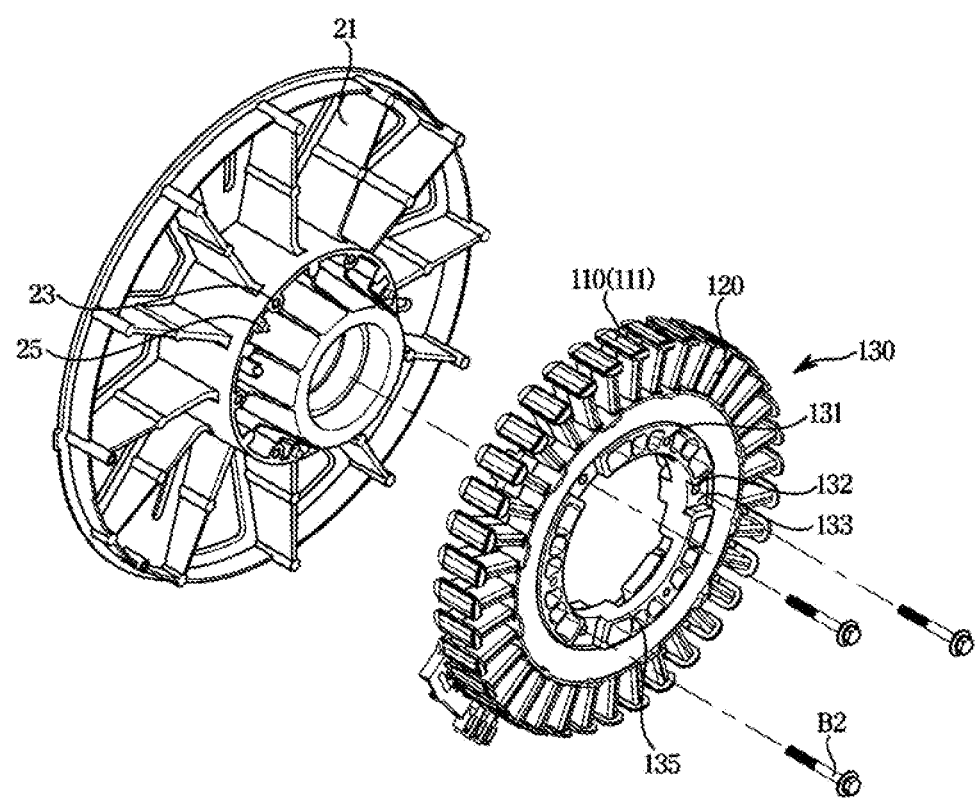
FIG. 8 is a view illustrating a state in which a bracket fastened to an insulator is fastened to a bearing housing according to an embodiment of the disclosure.
Figure 9:
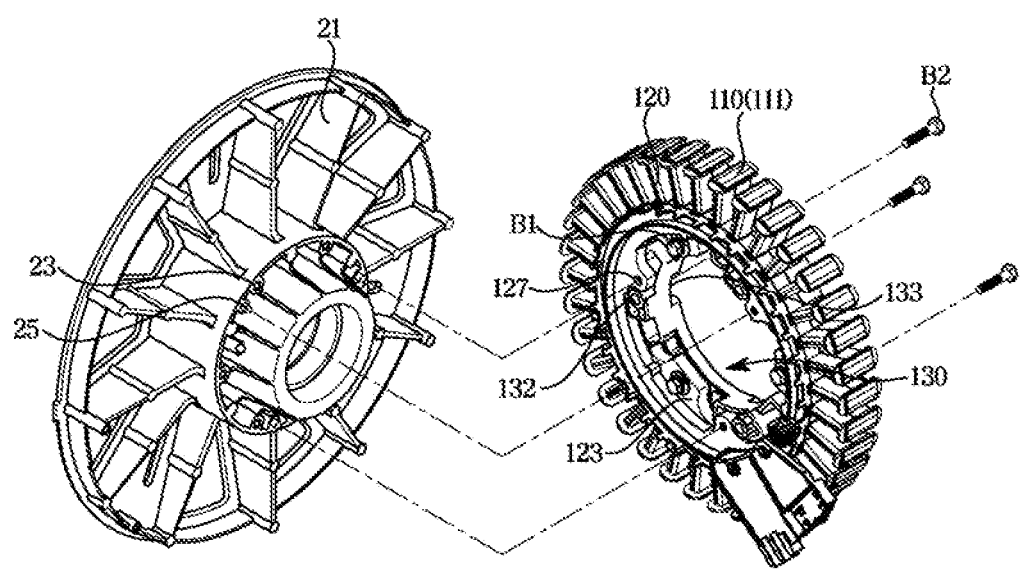
FIG. 9 is a view illustrating a direction of the insulator to which the bracket is fastened in FIG. 8 from a different direction.
Figure 10:
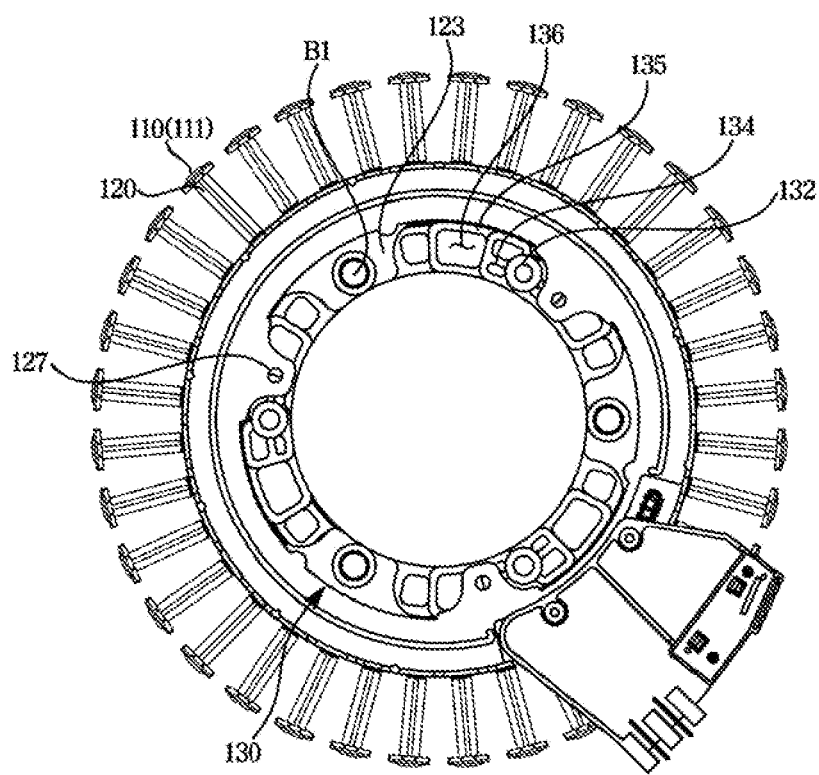
FIG. 10 is a plan view illustrating a state in which a bracket is fastened to an insulator according to an embodiment of the disclosure.

FIG. 8 is a view illustrating a state in which a bracket fastened to an insulator is fastened to a bearing housing according to an embodiment of the disclosure. FIG. 9 is a view illustrating a direction of the insulator to which a bracket is fastened in FIG. 8 from another direction. FIG. 10 is a plan view illustrating a state in which a bracket is fastened to an insulator according to an embodiment of the disclosure.

As shown in FIG. 8 to FIG. 10, the bracket 130 may be fastened to the tub 20 (see FIG. 2) by the plurality of second fasteners B2. In other words, the bracket 130 may be fastened to the bearing housing 21 by the plurality of second fasteners B2.

The bearing housing 21 may include a plurality of second bracket fastening holes 23 to which the bracket 130 is fastened. The plurality of second bracket fastening holes 23 may be provided at positions corresponding to a plurality of tub fastening holes 132 provided in the bracket 130. The plurality of second fasteners B2 fastening the bracket 130 to the bearing housing 21 are provided in a number corresponding to the plurality of tub fastening holes 132 and the plurality of second bracket fastening holes 23. In the drawings, the plurality of tub fastening holes 132 and the plurality of second bracket fastening holes 23 are provided three by one, but are not limited thereto. Three or more of the plurality of tub fastening holes 132 and the plurality of second bracket fastening holes 23 may be provided in consideration of fastening strength and stability between the bracket 130 and the bearing housing 21.

The bracket 130 may include the plurality of tub fastening holes 132 fastened to the bearing housing 21. The plurality of tub fastening holes 132 may be provided at positions corresponding to the plurality of second bracket fastening holes 23 provided in the bearing housing 21.

The bearing housing 21 may include a plurality of guide pins 25 guiding a position where the bracket 130 is fasten to the bearing housing 21. The insulator 120 may include a plurality of guide holes 127 to which the plurality of guide pins 25 are fixed. By inserting and fixing the plurality of guide pins 25 formed in the bearing housing 21 into the plurality of guide holes 127 formed in the insulator 120 in a state where the bracket 130 is fastened to the insulator 120, a position where the bracket 130 is fastened to the bearing housing 21 may be guided.

The bracket 130 may include a recessed portion 133 formed by recessing around the plurality of tub fastening holes 132 such that the second fastener B2 fastened to the plurality of tub fastening holes 132 avoids interference with the rotor 51 (see FIG. 2). In other words, the recessed portion 133 may be recessed toward the front side of the bracket 130 such that the plurality of second fasteners B2 do not protrude toward the rear side of the bracket 130.

The bracket 130 may include reinforcing ribs 134 formed around the plurality of tub fastening holes 132 to reinforce the strength of the bracket 130. When the bracket 130 is fastened to the bearing housing 21, the reinforcing ribs 134 may reinforce the strength of a portion where the bracket 130 is fastened to the bearing housing 21.

The bracket 130 may include a connecting rib 135 formed between the plurality of tub fastening holes 132 to connect the plurality of tub fastening holes 132.

The connecting rib 135 may include a plurality of through holes 136 opened to pass through the bracket 130. When fastening the bracket 130 fastened to the insulator 120 to the bearing housing 21, a user may visually check whether a fastening position is correct through the plurality of through holes 136.

Figure 11:
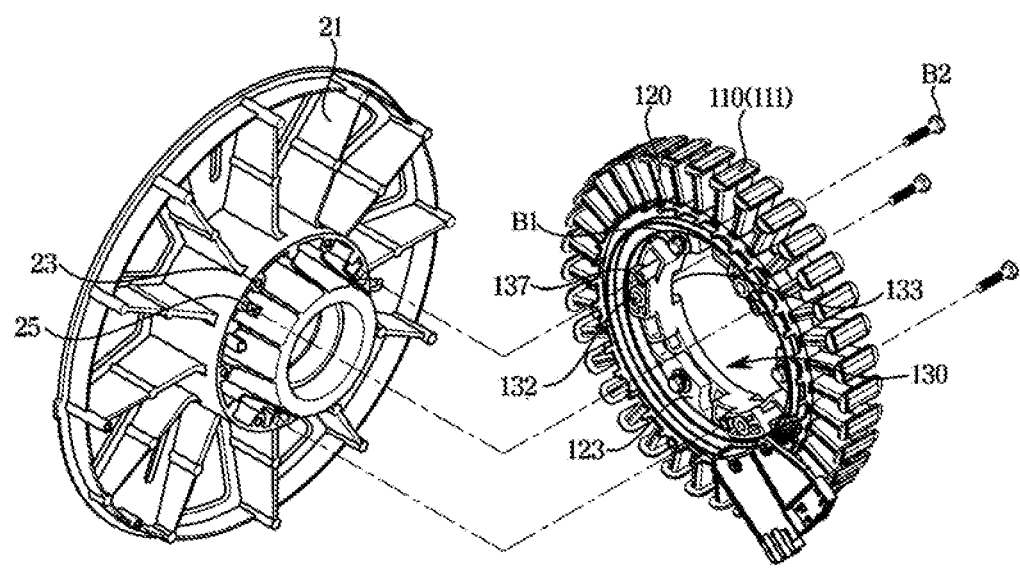
FIG. 11 is a view illustrating a state in which a bracket having a plurality of guide holes is fastened to a bearing housing according to another embodiment of the disclosure.

FIG. 11 is a view illustrating a state in which a bracket having a plurality of guide holes is fastened to a bearing housing according to another embodiment of the disclosure.

As shown in FIG. 11, the bracket 130 may be fastened to the tub 20 (see FIG. 2) by the plurality of second fasteners B2. In other words, the bracket 130 may be fastened to the bearing housing 21 by the plurality of second fasteners B2.

Because the configuration of the bracket 130 is the same as that of the bracket 130 shown in FIG. 9 except for the configuration in which the plurality of guide holes 137 are formed, a description of the same configuration will be omitted. That is, in FIG. 9, the plurality of guide holes 127 to which the plurality of guide pins 25 formed in the bearing housing 21 are fixed are formed in the insulator 120, but as shown in FIG. 11, a plurality of guide holes 135 may be formed on the bracket 130. The bracket 130 is different only at a position where the plurality of guide holes 135 are formed, and the remaining parts may be the same.

Figure 12:
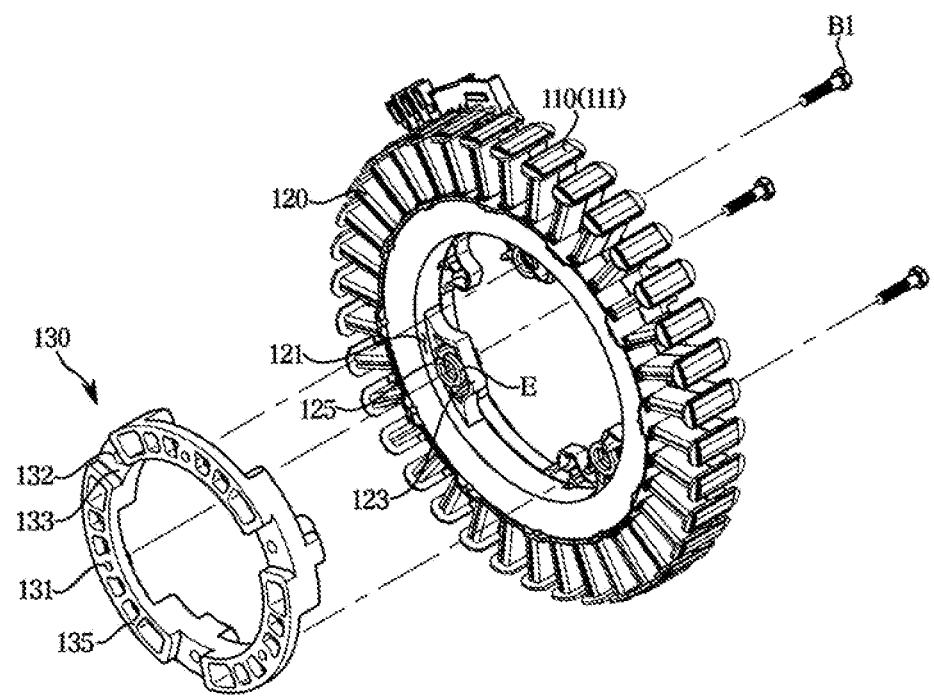
FIG. 12 is a view illustrating elastic members are provided between a plurality of first bracket fastening holes and a plurality of insulator fastening holes according to another embodiment of the disclosure.
Figure 13:
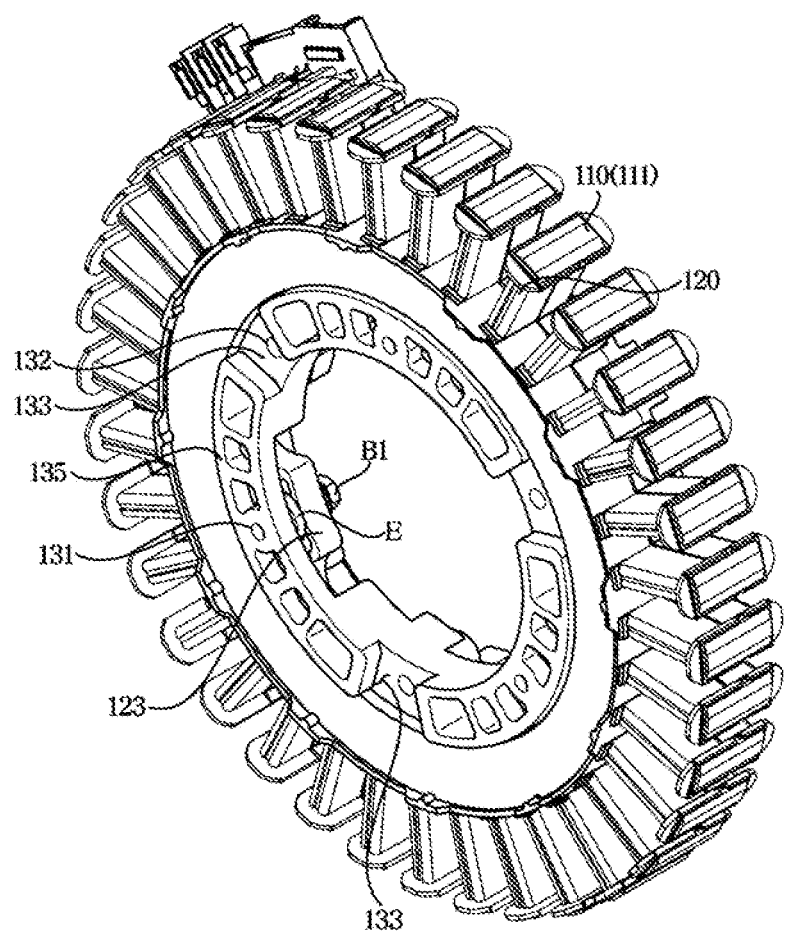
FIG. 13 is a view illustrating a state in which the bracket is fastened to the insulator in FIG. 12 according to an embodiment of the disclosure.

FIG. 12 is a view illustrating a state in which elastic members are provided between a plurality of first bracket fastening holes and a plurality of insulator fastening holes according to another embodiment of the disclosure. FIG. 13 is a view illustrating a state in which the bracket is fastened to the insulator in FIG. 12.

As shown in FIG. 12 and FIG. 13, an elastic member E may be provided between the insulator 120 and the bracket 130 fastened by the plurality of first fasteners B1. The elastic member E may be formed of a rubber material. The elastic member E may be provided between the plurality of first bracket fastening holes 125 formed in the insulator 120 and the plurality of insulator fastening holes 131 formed in the bracket 130. The vibration transmitted from the insulator 120 to the bracket 130 may be reduced by the elastic member E made of rubber. Accordingly, the vibration generated in the stator core 110 and transmitted to the tub (see FIG. 2) may be reduced.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A washing machine comprising:
   a tub;
   a stator fastenable to a rear of the tub; and
   a rotor to electromagnetically interact with the stator and rotatable around a rotating shaft;
   wherein the stator comprises:
   a stator core;
   an insulator configured to surround the stator core; and
   a bracket fastenable to the insulator and fastenable to the rear of the tub, such that while the stator is fastened to the rear of the tub the stator is fastened to the rear of the tub through the bracket while the bracket is fastened to the insulator and the rear of the tub,
   wherein the bracket includes a plurality of insulator fastening holes fastenable to the insulator by a first fastener, and a plurality of tub fastening holes fastenable to the tub by a second fastener.

2. The washing machine of claim 1, wherein the first fastener and the second fastener are fastenable in opposite directions with respect to the bracket.

3. The washing machine of claim 1, wherein the insulator includes a bracket receiving groove recessed so that the bracket is received and fastened to the insulator.

4. The washing machine of claim 3, wherein the insulator includes a plurality of bracket fastening portions to which the bracket is fastenable, and a plurality of first bracket fastening holes at positions corresponding to the plurality of insulator fastening holes of each of the plurality of bracket fastening portions and to which the bracket is fastenable by the first fastener.

5. The washing machine of claim 4, wherein portions of the insulator, except for the plurality of bracket fastening portions, are spaced apart from the bracket to prevent contact with the bracket.

6. The washing machine of claim 1, wherein the tub includes a bearing housing to which the stator is fastenable, and the bearing housing includes a plurality of second bracket fastening holes at positions corresponding to the plurality of tub fastening holes and to which the bracket is fastenable by the second fastener.

7. The washing machine of claim 6, wherein the bearing housing includes a plurality of guide pins configured to allow the bracket to be guided to a position to which the bracket is fastenable.

8. The washing machine of claim 7, wherein the insulator includes a plurality of guide holes to which the plurality of guide pins are coupleable to allow the bracket to be guided to a fastening position between the bearing housing and the bracket.

9. The washing machine of claim 7, wherein the bracket includes a plurality of guide holes to which the plurality of guide pins are coupleable to allow the bracket to be guided to a fastening position between the bearing housing and the bracket.

10. The washing machine of claim 1, wherein the bracket includes a recessed portion formed by recessing around the plurality of tub fastening holes such that the second fastener fastened to the plurality of tub fastening holes avoids interference with the rotor.

11. The washing machine of claim 1, wherein the bracket includes a reinforcing rib formed around the plurality of tub fastening holes to reinforce the bracket.

12. The washing machine of claim 11, wherein the bracket includes a connecting rib formed between the plurality of tub fastening holes to align the plurality of tub fastening holes.

13. The washing machine of claim 12, wherein the connecting rib includes a plurality of through holes to penetrate the bracket.

14. The washing machine of claim 4, wherein the bracket is formed of a metal material, with an elastic member formed of rubber between the plurality of first bracket fastening holes and the plurality of insulator fastening holes.

* * * * *